United States Patent [19]

Kanazawa et al.

[11] Patent Number: 4,732,231
[45] Date of Patent: Mar. 22, 1988

[54] VEHICLE FOUR WHEEL STEERING SYSTEM

[75] Inventors: Hirotaka Kanazawa; Teruhiko Takatani; Shigeki Furutani, all of Hiroshima; Isamu Chikuma, Gunma; Satoru Shimada, Gunma; Hiroshi Eda, Gunma, all of Japan

[73] Assignees: Mazda Motor Corporation, Hiroshima; Nippon Seiko Kabushiki Kaisha, Tokyo, both of Japan

[21] Appl. No.: 895,227

[22] Filed: Aug. 11, 1986

[30] Foreign Application Priority Data

Aug. 13, 1985 [JP] Japan ................................. 60-176962

[51] Int. Cl.⁴ ............................................. B62D 5/06
[52] U.S. Cl. ..................................... 180/140; 91/378; 180/148; 280/91
[58] Field of Search .................. 180/140, 147, 148; 280/91; 92/136, 110; 91/374, 378; 74/388 PS, 498

[56] References Cited

U.S. PATENT DOCUMENTS

| | | | |
|---|---|---|---|
| 4,146,244 | 3/1979 | Presley | 180/148 X |
| 4,182,221 | 1/1980 | Presley | 180/148 X |
| 4,467,885 | 8/1984 | Furukawa et al. | 180/140 |
| 4,621,823 | 11/1986 | Sano | 280/91 |

FOREIGN PATENT DOCUMENTS

| | | | |
|---|---|---|---|
| 60-64074 | 4/1985 | Japan | 280/91 |
| 60-61371 | 4/1985 | Japan | 280/91 |

Primary Examiner—John J. Love
Assistant Examiner—Charles R. Watts
Attorney, Agent, or Firm—Fleit, Jacobson, Cohn & Price

[57] ABSTRACT

A vehicle four wheel steering system including a rear wheel steering mechanism with a power assist device. The rear wheel steering mechanism includes a steering rod extending transversely of the vehicle and having the opposite ends connected with tie rods which are in turn connected with knuckle arms of the rear wheels. The steering rod is provided with a power cylinder in which a piston is slidably disposed. The piston is provided on the steering rod and defines hydraulic chambers in the cylinder. A control valve is provided to control hydraulic oil supply to the power cylinder. The control valve has a casing which is connected with the steering rod through an interconnecting section and hydraulic oil passages are formed in the interconnecting section for passing hydraulic oil to and from the power cylinder.

13 Claims, 11 Drawing Figures

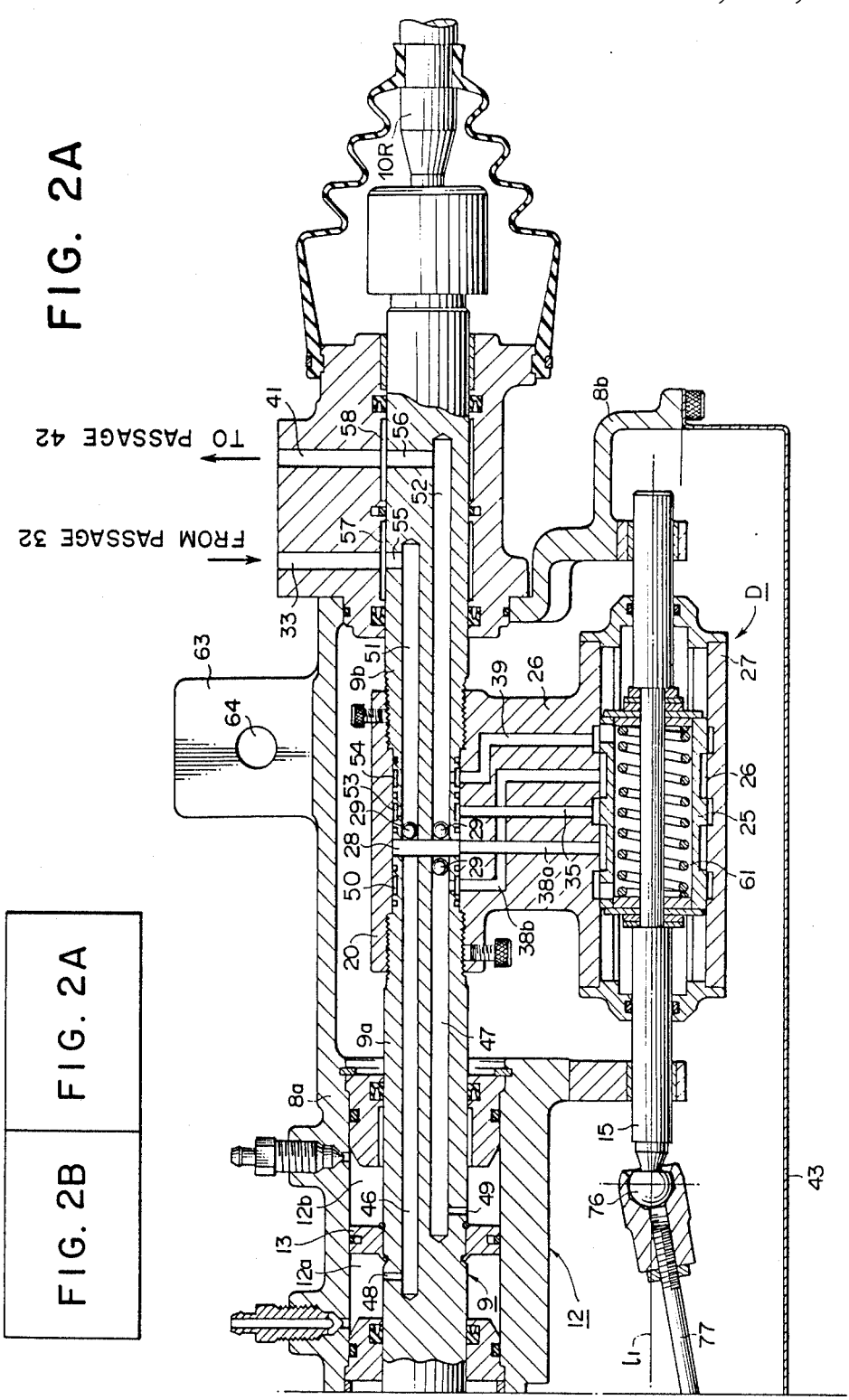

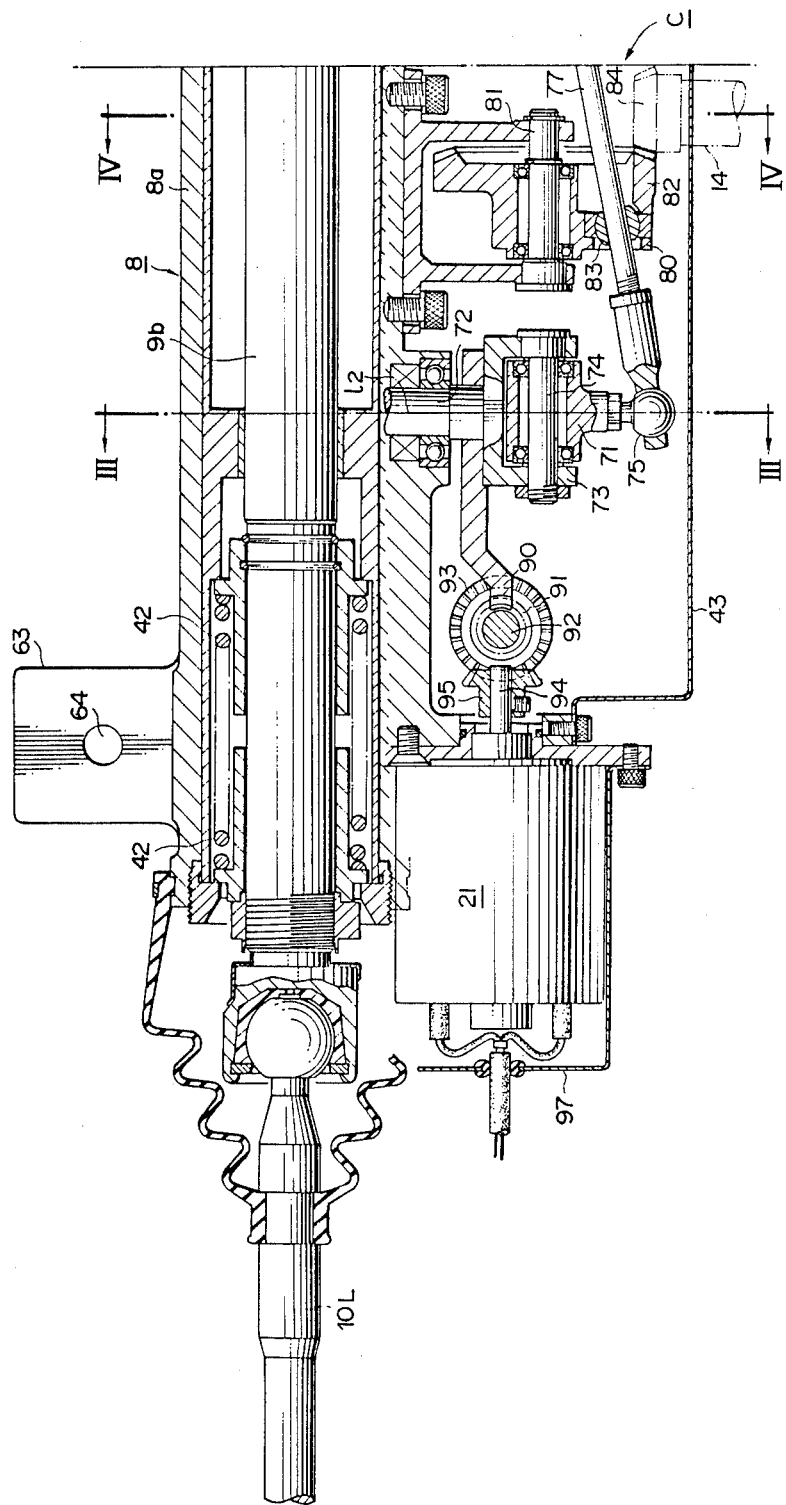

VEHICLE FOUR WHEEL STEERING SYSTEM

BACKGROUND OF THE INVENTION

1. Field of the Invention

The present invention relates to vehicle steering systems, and more particularly to vehicle four wheel steering systems wherein rear wheels as well as front wheels are steered.

2. Description of the Prior Art

Conventionally, a four-wheeled vehicle has a steering system which is adapted to steer only the front wheels. It has however been proposed for the purpose of improving the maneuverability of the vehicle to steer not only the front wheels but also the rear wheels. It has further been proposed in such four-wheel steering system to provide a power-assisted steering mechanism for steering the rear wheels. For example, the U.S. Pat. No. 4,467,885 discloses a vehicle four-wheel steering system having a power-assisted steering mechanism provided for steering the rear wheels.

In general, a power-assisted steering mechanism includes a power cylinder and a power piston disposed in the power cylinder for axial sliding movement to define hydraulic oil chambers in the power cylinder. Further, a control valve mechanism is associated with the power cylinder to control the hydraulic fluid flow into and out of the hydraulic chambers in the power cylinders. It should be noted herein that such power-assisted steering system has a lot of conduit connecting the hydraulic chambers in the power cylinder with the control valve, and connecting the control valve with the hydraulic pump and the hydraulic oil reservoir. Usually, these conduits are provided by external pipes and hoses so that a lot of pipes and hoses have to be arranged in a limited space. Particularly, in a power-assisted rear wheel steering mechanism, available spaces for the conduits are very limited so that it is very difficult to arrange the conduits in a reliable manner.

SUMMARY OF THE INVENTION

It is therefore an object of the present invention to provide a four-wheel steering system having a power-assisted rear wheel steering mechanism with an improved reliability.

Another object of the present invention is to provide a power-assisted rear wheel steering mechanism which requires only a limited number of outside conduits.

A further object of the present invention is to provide a power-assist device for a rear wheel steering mechanism in which substantial part of the conduits are encased.

According to the present invention, the above and other objects can be accomplished by a vehicle four-wheel steering system comprising a manually operated steering member, front wheel steering means coupled with said steering member for producing steering movements in vehicle front wheels in accordance with movements in the steering member, rear wheel steering means coupled with said steering member for producing steering movements in vehicle rear wheels in accordance with the movements in the steering member, said rear wheel steering means including rear wheel steering rod means adapted for movements in substantially transversely of the vehicle and connected with said vehicle rear wheels for producing steering movements therein, power assist piston-and-cylinder means connected with said steering rod means and including cylinder means and piston means in said cylinder means for defining hydraulic chamber means, control valve means for controlling supply of hydraulic pressure to said hydraulic chamber means to assist movement of the steering rod means in producing the steering movements in the vehicle rear wheels, said control valve means including valve casing means connected with said piston-and-cylinder means through interconnecting means, control rod means carried by said valve casing means for a sliding movement in response to the movement of the steering member and connected with said control valve means to transmit the movement of the steering member to said control valve means so that the control valve means is operated in accordance with the movement of the steering member to thereby control the hydraulic pressure to the hydraulic chamber means, hydraulic passage means formed in said interconnecting means and communicated with said hydraulic chamber means for passing hydraulic fluid into and out of the hydraulic chamber means and the control valve means.

According to a more specific feature of the present invention, there is provided a vehicle four-wheel steering system including a manually operated steering member, front wheel steering means for producing steering movements in vehicle front wheels in accordance with movements in the steering member, rear wheel steering means for producing steering movements in vehicle rear wheels, said rear wheel steering means including a rear wheel steering rod movable substantially transversely of the vehicle and connected with the vehicle rear wheels for producing the steering movements in the rear wheels, power assist means comprising a hydraulic cylinder and a piston located in said cylinder for sliding movements, said power assist means having hydraulic chambers defined in said cylinder by said piston, said piston being connected with said steering rod a control valve for controlling supply of hydraulic pressure to and from said hydraulic chambers, said control valve having a casing connected with said steering rod through an interconnecting section and a valve member in said casing, a control rod movable in response to a movement in the steering member and connected with said valve member for transmitting the movement of the steering member to the valve member, said control valve having hydraulic fluid passages formed in said interconnecting section for passing hydraulic fluid into and out of said control valve and said hydraulic chambers.

According to the features of the present invention, the hydraulic passage for the fluid into and out of the control valve are formed in the interconnecting section between the control valve casing and the power assist means. It is therefore possible to decrease the number of the outside conduits so that the conduits can be arranged in a limited space in a reliable manner. It is preferable to form hydraulic fluid passages also in the rear wheel steering rod of the power assist means so that the number of the outside conduits can further be decreased.

The above and other objects and features of the present invention will become apparent from the following descriptions of a preferred embodiment taking reference to the accompanying drawings.

BRIEF DESCRIPTIONS OF THE DRAWINGS

FIG. 2 is a schematic of the relationship of FIGS. 2A and 2B;

FIG. 2A is a fragmentary sectional view showing a right side half of the rear wheel steering mechanism;

FIG. 2B is a fragmentary sectional view showing a left side half of the rear wheel steering mechanism;

DESCRIPTIONS OF THE PREFERRED EMBODIMENT

Figure 1:
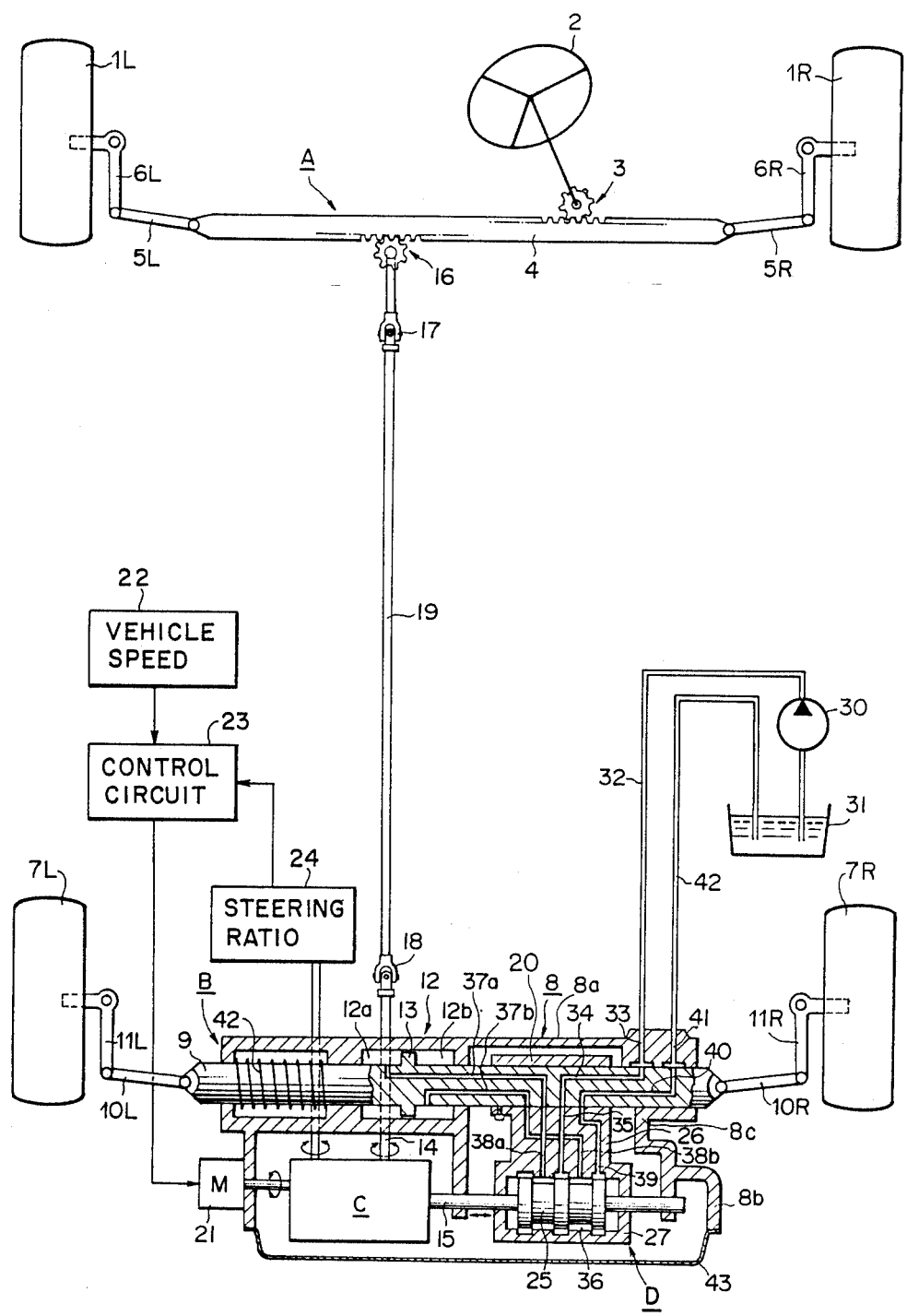
FIG. 1 is a partially sectioned schematic plan view of a vehicle four-wheel steering system in accordance with one embodiment of the present invention.

Referring to the drawings, particularly to FIG. 1, the vehicle steering system shown therein includes a front wheel steering mechanism A for steering left and right front wheels 1L and 1R and a rear wheel steering mechanism for steering left and right rear wheels 7L and 7R. The front wheel steering mechanism A includes a rack-and-pinion mechanism 3 associated with a steering wheel 2 for converting a rotation of the steering wheel 2 into an axial movement of a front steering rod 4 on which the rack-and-pinion mechanism 3 is provided. The front steering rod 4 is connected at the opposite ends with tie rods 5L and 5R which are in turn connected with knuckle arms 6L and 6R on the front wheels 1L and 1R, respectively.

The rear wheel steering mechanism B includes a power assist mechanism having a housing 8 which is partly constituted by a cylindrical casing 8a. In the casing 8a, there is disposed a rear wheel steering rod 9 which extends through the casing 8a and has the opposite ends connected through tie rods 10L and 10R with knuckle arms 11L and 11R on the rear wheels 7L and 7R, respectively. It will be understood that, with the arrangement described above, left and right movements of the steering rod 8a will produce steering movements in the rear wheels 7L and 7R.

The casing 8a is formed with a power cylinder 12 encircling the steering rod 9 which is provided with a piston 13 dividing the interior space of the cylinder 12 into hydraulic chambers 12a and 12b. The rear wheel steering mechanism B further includes a control unit C having an input shaft 14 and an output shaft 15 which may be referred to as a control rod. The control rod 15 is located to extend in parallel with the steering rod 8a.

There is a second rack-and-pinion mechanism 16 provided on the front wheel steering rod 4. The second rack-and-pinion mechanism 16 is connected through universal joints 17 and 18 and a connecting rod 19 with the input shaft 14 so that an axial movement of the steering rod 4 is converted into a rotation of the rod 19 and transmitted to the input shaft of the control unit C. A pulse motor 21 is provided on the control unit C to adjust the steering ratio which is defined as a ratio of the steered angle $A_r$ of the rear wheel to the steered angle $A_f$ of the front wheel. The motor 21 is connected with a control circuit 23 which receives a vehicle speed signal from a speed detector 22 so that the rotation of the motor 21 controlled in accordance with the vehicle speed to thereby control the steering ratio. A steering ratio detector 24 is provided to detect the steering ratio as determined by the control unit C and produces a ratio signal which is applied to the control circuit 23 as a feedback signal.

In FIG. 1, it will be noted that a casing 8b is further formed integrally with the casing 8a through an interconnecting section 8c. In the casing 8b, there is provided a hydraulic control valve device D for controlling a supply of hydraulic pressure to and from the cylinder 12. The control valve device D includes a valve casing 27 which is connected with the rear wheel steering rod 9 through an interconnecting section 26. In the valve casing 27, there is a valve spool 25 which is connected at one end with the control rod 15 so that it is moved by the control rod in the direction parallel with the steering rod 9. In order to control the hydraulic fluid supply to and from the control valve device D and the power cylinder 12, the casing 8a, the steering rod 9 and the interconnecting section 26 are formed with hydraulic oil passages which will be described hereinafter.

As shown in FIG. 1, there is provided a hydraulic oil reservoir 31 and a hydraulic pump 30 draws oil from the reservoir 31. The pump 30 has an outlet port which is connected through a conduit 32 into a passage 33 which is formed in the casing 8a. The passage 33 is in communication with a passage 34 in the rear wheel steering rod 9, the passage 34 being in turn connected with a passage 35 which is formed in the interconnecting section 26 and leads to the control valve device D at a valve chamber 36 in the casing 27. The hydraulic oil chambers 12a and 12b in the power cylinder 12 are connected respectively through passages 37a and 37b in the steering rod 9 and passages 38a and 38b in the interconnecting section 26 with the valve chamber 36. The interconnecting section 26 is further formed with a passage 39 which is connected on one hand with the valve chamber 36 and on the other hand with a passage 40 which is formed in the steering rod 9 and connected through a passage 41 in the casing 8a and a conduit 42 with the oil reservoir 31 for providing a return passage. The valve spool 25 functions to control communications of the passages 38a and 38b with the passages 35 and 39 in accordance with the position of the control rod 15. Thus, the hydraulic oil supply to and from the hydraulic chambers 12a and 12b is controlled in accordance with the position of the control rod 15. In order to urge the steering rod 9 to a neutral position, there is provided a return spring 42. An oil pan 43 is attached to the housing 8 to cover the bottom part of the control valve device D and the control unit C.

Referring to FIGS. 2A and 2B, there are shown in detail the power cylinder 12, and the control valve device D including the valve spool 25 and the valve casing 27, as well as the oil passages for these components. As shown, the steering rod 9 is formed by a pair of axially aligned rod parts 9a and 9b which are threadably connected together by a hollow sleeve 20 which is integral with the valve casing 27 through the interconnecting section 26. It will be noted in FIG. 2A, the rod parts 9a and 9b are connected together by the sleeve 20 with a spacing between the adjacent ends of the rod parts to form a chamber 28. Appropriate seals may be provided around the end portions of the rod parts 9a and 9b to seal the chamber 28. The left hand rod part 9a is formed with axial passages 46 and 47 which open respectively through ports 48 and 49 into the hydraulic chambers 12a and 12b. As will be understood, the passages 46 and 47 constitute parts of the passages 37a and 37b, respectively. The passage 46 is opened to the chamber 28 and the passage 38a in the interconnecting section 26 is opened to the chamber 28. The passage 47 is closed at the end adjacent to the chamber 28 by a plug 29 and opened through an annular groove 50 in the rod part 9a to the passage 38b in the interconnecting section 26.

Similarly, the right hand rod section 9b is formed with axial passages 51 and 52. The passages 51 and 52 are closed at one end by plugs 29 and connected at portions adjacent to the closed ends through annular grooves 53 and 54 in the rod part 9b respectively to the passages 35 and 39 in the interconnecting section 26. At the other ends, the passages 51 and 52 are connected through ports 55 and 56 in the rod part 9b and annular grooves 57 and 58 in the casing 8a with the passages 33 and 41, respectively. It will be noted that the annular grooves 57 and 58 have sufficient axial length so that the communications between the passages 33 and 51 and between the passages 41 and 52 can be maintained throughout the axial movement of the steering rod.

The control valve mechanism D is substantially of a conventional structure so that detailed descriptions on the valve casing 27, the hydraulic chamber 36 and the valve spool 25 will be omitted. It will be noted herein, however, that the valve spool 25 is of a hollow structure and a return spring 61 is disposed in the return spring 61 to act between the control rod 15 and the valve casing 27 so that the control rod is urged in the neutral position with respect to the valve casing 27 even when there is a displacement in the valve casing 27 during the steering movement of the rod 9.

Referring now to FIG. 2B, there is shown details of the control unit C. The control unit C is of the type which is disclosed by the U.S. Pat. No. 4,572,316 so that the specification of this patent is also referred to. Referring back to FIG. 2A, it will be noted that the control rod 15 is connected with the valve spool 25 and movable in the transverse direction of the vehicle, the direction of the movement being shown by a line $1_1$. As shown in FIG. 2B, the control unit C includes a swingable arm 71 which is mounted on a fitting 73 provided at one end of a shaft 72 through a pin 74 for swingable movement about the axis of the pin 74. The shaft 72 is mounted on the housing 8 for rotation about an axis $1_2$ which is perpendicular to the direction of movement of the control rod 15 as shown by the line $1_1$. The pin 74 supporting the swingable arm 71 is located at the intersection between the lines $1_1$ and $1_2$ to extend perpendicularly to the axis $1_2$. It will therefore be understood that the axis of the pin 74 generally makes an angle with the line $1_1$, the angle being changed in response to a rotation of the shaft 72. In other words, the swingable arm makes a swingable movement in a plane which is inclined with respect to a reference plane which is perpendicular to the line $1_1$ and the angle of the inclination is changed in response to a rotation of the shaft 72.

The swingable arm 71 is connected at its free end with the control rod 15 through a connecting rod 77 which is connected at one end with the swingable arm by means of a ball joint 75 and at the other end with the control rod 15 by means of a ball joint 76. The connecting rod 77 is adjustable in length and has a rigidity for maintaining the distance between the ball joints 75 and 76. It will therefore be understood that a displacement of the ball joint 75 in the direction parallel to the line $1_1$ will produce a displacement of the control rod 15 along the line $1_1$.

In FIG. 2B, it will further be noted that the connecting rod 77 is supported at a portion adjacent to the ball joint 75 by a swing arm 80 which is formed on a bevel gear 82 rotatably mounted on a pin 81 coaxial with the line $1_1$. The rod 77 is connected with the swing arm 80 by means of a ball joint 83 which is slidable along the rod 77 and in the direction perpendicular to the line $1_1$ movement on a pin 81. The shaft 14 which is shown in FIG. 2B by phantom lines has a bevel gear 84 which is in meshing engagement with the bevel gear 82 so that a rotation of the steering wheel 2 is transmitted to the swing arm 80 through the bevel gears 84 and 82. Thus, the swingable arm 71 is swingably moved by an angle corresponding to the rotation of the steering wheel.

In case where the pin 74 is aligned with the line $1_1$, a swinging movement of the arm 71 simply produces a movement of the ball joint 75 along a circle in the reference plane so that there will be no axial movement of the control rod 15. If the pin 74 is inclined with respect to the line $1_1$, a rotation of the arm 71 produces a displacement of the ball joint 75 in the direction parallel with the line $1_1$. The movement is then transmitted to the control rod 15 to move the rod 15 along the line $1_1$ to thereby operate the valve spool 25 in the control valve device D. It will be understood that the amount of the displacement of the ball joint 75 changes in accordance with the angle of inclination of the pin 74 with respect to the line $1_1$.

Figure 3:
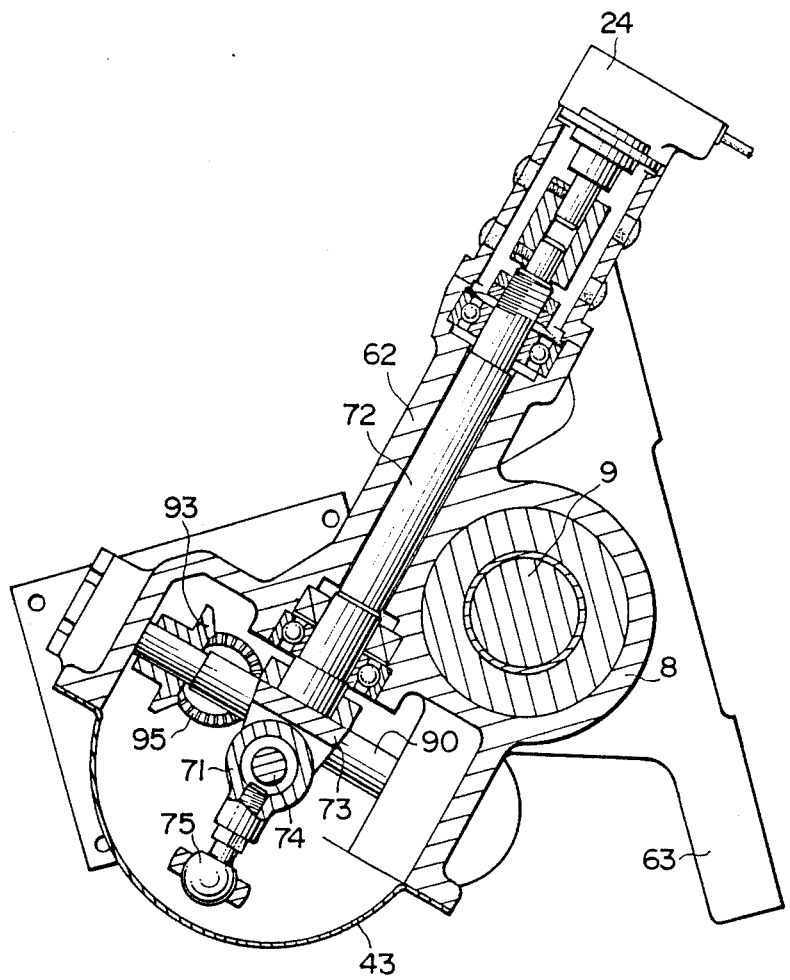
FIG. 3 is a sectional view taken substantially along the line III—III in FIG. 2B.
Figure 4:
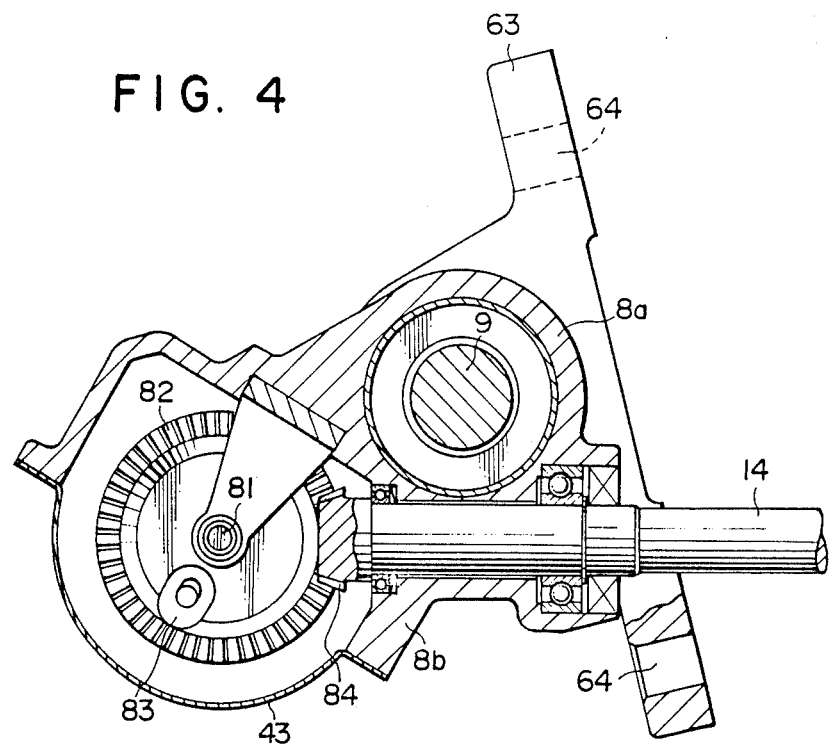
FIG. 4 is a sectional view taken substantially along the line IV—IV in FIG. 2B.
Figure 5:
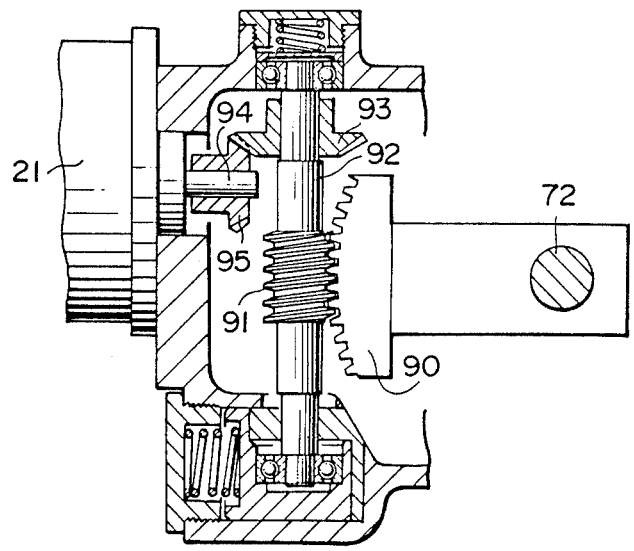
FIG. 5 is a partially-sectioned bottom view showing the motor drive mechanism shown in FIG. 5.

In order to adjust the inclination angle of the pin 74, the shaft 72 is provided with a sector gear 90 as shown in FIG. 5. The gear 90 is in meshing engagement with a worm 91 formed on a shaft 92. The shaft 92 is provided with a bevel gear 93 which is in meshing engagement with a bevel gear 95 provided on an output shaft 94 of the motor 21. It will be noted in FIG. 2B that the motor 21 is mounted on the housing 8 at a space provided in a corner between the casings 8a and 8b so that the motor can be arranged without requiring any substantial additional space. The motor 21 is arranged so that the output shaft 94 extends in parallel with the line $1_1$. A cover 97 is provided to enclose the motor 21. In FIG. 3, it will be noted that the shaft 72 extends through a cylindrical portion 62 extending upwardly from the housing 8 and connected at the upper end with a steering ratio detector 24 which functions to detect the inclination angle of the shaft 74.

Figure 6:
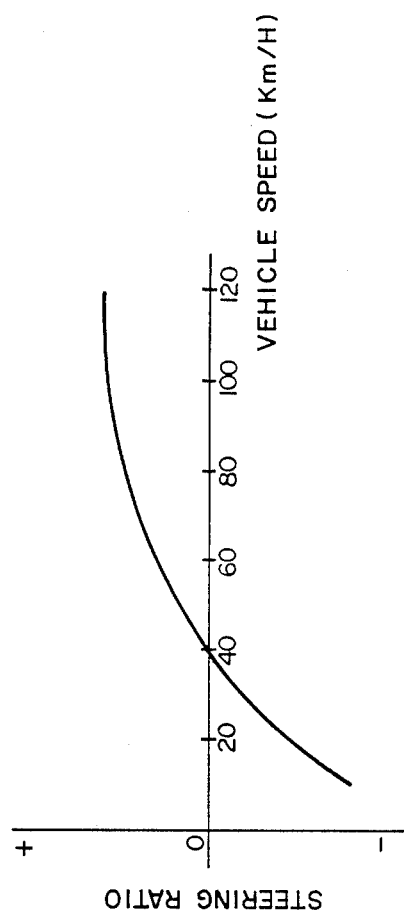
FIG. 6 is a diagram showing the relationship between the vehicle speed and the steering angle ratio.

FIG. 6 shows an example of a preferred control of the steering ratio in accordance with the vehicle speed. As shown, under a low vehicle speed, the rear wheels are steered in the direction opposite to the direction of steering of the front wheels so as to obtain an improved turning rate. At the vehicle speed of 40 km/h, the steering ratio becomes zero so that the rear wheels are not steered. Under a high vehicle speed, the rear wheels are steered in the direction same as the direction of the steering of the front wheels so that the road grip of the wheels under cornering will be improved. The control unit C is adjusted so that the steering ratio is controlled in accordance with the vehicle speed in the manner as shown in FIG. 6. In order to protect the steering ratio detector 24 from foreign articles, it is located above the rear wheel steering rod 9.

Figure 7:
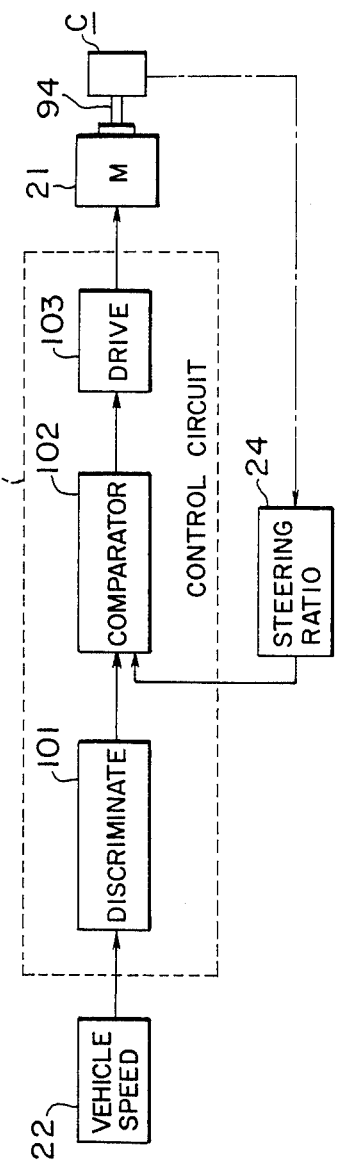
FIG. 7 is a block diagram showing a control for changing the steering angle ratio.

Referring to FIG. 7, there is shown an example of the control circuit 23 for controlling the motor 21 to thereby control the steering ratio. The circuit 23 includes a discriminating circuit 101 which receives a vehicle speed signal from the speed detector 22. The discriminating circuit 101 has an output connected with a comparator 102 of which output is connected with a drive circuit 103. The comparator 102 further receives a steering ratio signal from the detector 24 and compares the signal from the discriminating circuit with the steering ratio signal. The driving circuit receives the output of the comparator and produces a motor driving signal.

Figure 8:
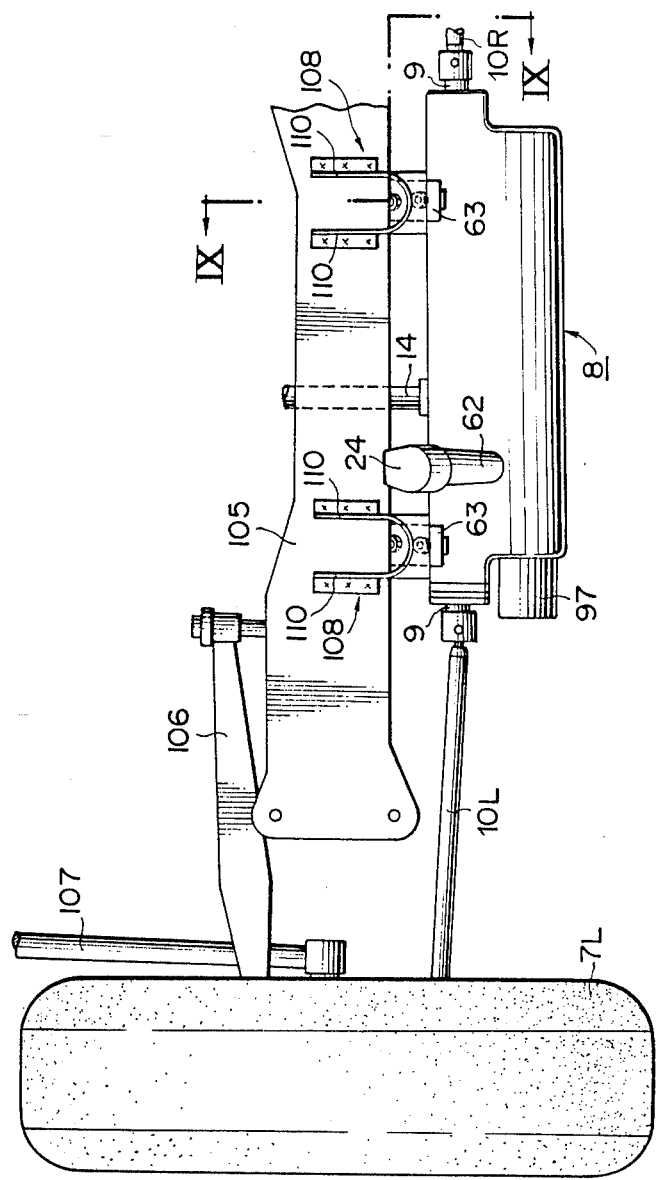
FIG. 8 is a fragmentary plan view showing the vehicle rear body section having the rear wheel steering mechanism; and, FIG. 9 is a sectional view taken substantially along the line IX—IX in FIG. 8.
Figure 9:
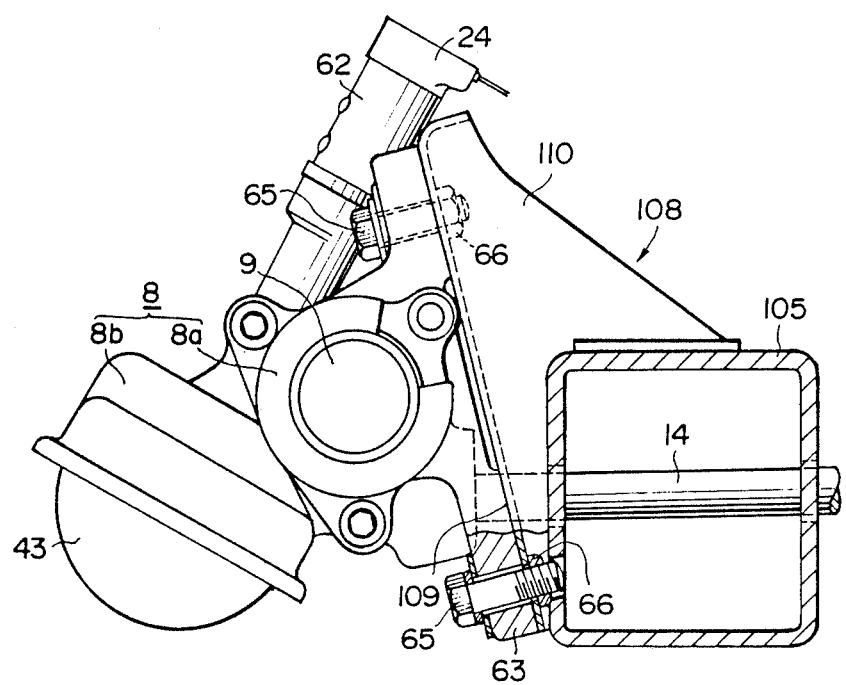

Referring now to FIGS. 8 and 9, it will be noted that the vehicle body has a transversely extending sub-frame 105 which is connected with a main frame (not shown). The rear wheels 7L and 7R are supported by the sub-frame 105 through suspension mechanisms including suspension arms 106, struts (not shown) and links 107. At the front side of the sub-frame 105, there are brackets 108 which are attached to the sub-frame 105 at transversely spaced positions. The bracket 108 has a front wall 109 which is located forward the sub-frame 105 and inclined slightly forwardly, and a pair of side walls 110 extending rearward from the opposite sides of the front wall 109 and welded to the sub-frame 105. As shown in FIGS. 2A, 2B, 3 and 4, the casing 8a supporting the steering rod 9 is formed with a pair of attachment flanges 63 each having a pair of bolt holes 64. The casing 8a is attached to the brackets 108 at the flanges 63 by means of bolts 65 inserted into the bolt holes 64 and nuts 66 engaged with the bolts 65.

From the above description, it will be understood that according to the present invention the control valve device D has a casing which is connected with the rear wheel steering rod through an interconnecting section and the hydraulic fluid passages are formed in the interconnecting section. It is therefore possible to decrease the number of the outside conduits so that the outside conduits can be arranged in a limited space in a reliable manner. In the arrangement shown in the drawings, the passages to and from the control valve are completely in the casing so that the conduit arrangement can be made significantly simple.

The invention has thus been shown and described with reference to a specific embodiment, however, it should be noted that the invention is in no way limited to the details of the illustrated arrangements but changes and modifications may be made without departing from the scope of the appended claims.

We claim:

1. A vehicle four-wheel steering system comprising a manually operated steering member, front wheel steering means coupled with said steering member for producing steering movements in vehicle front wheels in accordance with movements in the steering member, rear wheel steering means coupled with said steering member for producing steering movements in vehicle rear wheels in accordance with the movements in the steering member, said rear wheel steering means including rear wheel steering rod means adapted for movements substantially transversely of the vehicle and connected with said vehicle rear wheels for producing steering movements therein, power assist piston-and-cylinder means connected with said steering rod means and including cylinder means and piston means in said cylinder means for defining hydraulic chamber means, control valve means for controlling supply of hydraulic pressure to said hydraulic chamber means to assist movement of the steering rod means in producing the steering movements in the vehicle rear wheels, said control valve means including valve casing means connected with said piston-and-cylinder means through interconnecting means, control rod means carried by said valve casing means for a sliding movement in response to the movement of the steering member and connected with said control valve means to transmit the movement of the steering member to said control valve means so that the control valve means is operated in accordance with the movement of the steering member to thereby control the hydraulic pressure to the hydraulic chamber means, hydraulic passage means formed in said interconnecting means and said steering rod means, said hydraulic passage means including valve passage means connecting said control valve means with said hydraulic chamber means, pressure supply passage means connecting hydraulic pressure source means with said control valve means and return passage means for exhausting the hydraulic pressure from said control valve means.

2. A vehicle steering system in accordance with claim 1 in which said piston means in said power assisted piston-cylinder means is connected with said steering rod means.

3. A vehicle steering system in accordance with claim 1 in which hydraulic passage means is provided in said steering rod means.

4. A vehicle steering system in accordance with claim 1 in which said steering rod means is slidably supported by first casing means secured to a vehicle body and said control rod means is supported by second casing means which is formed as a unit with the first casing means.

5. A vehicle steering system in accordance with claim 4 in which said second casing means is opened at bottom and oil pan means is provided to cover the bottom of the second casing means.

6. A vehicle steering system in accordance with claim 1 in which said rear wheel steering rod means is supported for sliding movement in cylindrical casing means, said casing means being formed with attachment flange means which is attached to a vehicle frame.

7. A vehicle four-wheel steering system comprising a manually operated steering member, front wheel steering means coupled with said steering member for producing steering movements in vehicle front wheels in accordance with movements in the steering member, rear wheel steering means coupled with said steering member for producing steering movements in vehicle rear wheels in accordance with the movements in the steering member, said rear wheel steering means including rear wheel steering rod means adapted for movements substantially transversely of the vehicle and connected with said vehicle rear wheels for producing steering movements therein, power assist piston-and-cylinder means connected with said steering rod means and including cylinder means and piston means in said cylinder means for defining hydraulic chamber means, control valve means for controlling supply of hydraulic pressure to said hydraulic chamber means to assist movement of the steering rod means in producing the steering movements in the vehicle rear wheels, said control valve means including valve casing means connected with said piston-and-cylinder means through interconnecting means, control rod means carried by said valve casing means for a sliding movement in response to the movement of the steering member and connected with said control valve means to transmit the movement of the steering member to said control valve means so that the control valve means is operated in accordance with the movement of the steering member to thereby control the hydraulic pressure to the hydraulic chamber means, hydraulic passage means formed in said interconnecting means and communicated with said hydraulic chamber means for passing hydraulic fluid into and out of the hydraulic chamber means and the control valve means wherein said steering rod means is slidably supported by first casing means secured to a vehicle body, said control rod means is supported by second casing means which is formed as a unit with the first casing means, and said control rod means is connected with electric motor means operated under an electric signal, said motor means being mounted at a corner between said first and second casing means at a side of the second casing means.

8. A vehicle four-wheel steering system including a manually operated steering member, front wheel steering means for producing steering movements in vehicle front wheels in accordance with movements in the steering member, rear wheel steering means for producing steering movements in vehicle rear wheels, said rear wheel steering means including a rear wheel steering rod movable substantially transversely of the vehicle and connected with the vehicle rear wheels for producing the steering movements in the rear wheels, power assist means comprising a hydraulic cylinder and a piston located in said cylinder for sliding movements, said power assist means having hydraulic chambers defined in said cylinder by said piston, said piston being connected with said steering rod, a control valve for controlling supply of hydraulic pressure to and from said hydraulic chambers, said control valve having a casing connected with said steering rod through an interconnecting section and a valve member in said casing, a control rod movable in response to a movement in the steering member and connected with said valve member for transmitting the movement of the steering member to the valve member, a hydraulic pressure supply passage for supplying a hydraulic pressure to said control valve, valve passages connecting the control valve with the hydraulic chambers, a return passage for exhausting the hydraulic pressure from the control valve, said pressure supply passage, said valve passages and said return passage being formed in said interconnecting section and said steering rod.

9. A vehicle four-wheel steering system comprising a manually operated steering member, front wheel steering means coupled with said steering member for producing steering movements in vehicle front wheels in accordance with movements in the steering member, rear wheel steering means coupled with said steering member for producing steering movements in vehicle rear wheels in accordance with the movements in the steering member, said rear wheel steering means including rear wheel steering rod means adapted for movements substantially transversely of the vehicle and connected with said vehicle rear wheels for producing steering movements therein, power assist piston-and-cylinder means connected with said steering rod means and including cylinder means and piston means in said cylinder means for defining hydraulic chamber means, control valve means for controlling supply of hydraulic pressure to said hydraulic chamber means to assist movement of the steering rod means in producing the steering movements in the vehicle rear wheels, said control valve means including valve casing means connected with said piston-and-cylinder means through interconnecting means, control rod means carried by said valve casing means for a sliding movement in response to the movement of the steering member and connected with said control valve means to transmit the movement of the steering member to said control valve means so that the control valve means is operated in accordance with the movement of the steering member to thereby control the hydraulic pressure to the hydraulic chamber means, hydraulic passage means formed in said interconnecting means and communicated with said hydraulic chamber means for passing hydraulic fluid into and out of the hydraulic chamber means and the control valve means, said control rod means being connected with electric motor means operated under an electric signal, said motor means being mounted at a corner of casing means supporting said steering rod means.

10. A vehicle four-wheel steering system comprising a manually operated steering member, front wheel steering means coupled with said steering member for producing steering movements in vehicle front wheels in accordance with movements in the steering member, rear wheel steering means coupled with said steering member for producing steering movements in vehicle rear wheels in accordance with the movements in the steering member, said rear wheel steering means including rear wheel steering rod means adapted for movements substantially transversely of the vehicle and connected with said vehicle rear wheels for producing steering movements therein, power assist piston-and-cylinder means connected with said steering rod means and including cylinder means and piston means in said cylinder means for defining hydraulic chamber means, control valve means for controlling supply of hydraulic pressure to said hydraulic chamber means to assist movement of the steering rod means in producing the steering movements in the vehicle rear wheels, said control valve means including valve casing means connected with said piston-and-cylinder means, control rod means carried by said valve casing means for a sliding movement in response to the movement of the steering member and connected with said control valve means to transmit the movement of the steering member to said control valve means so that the control valve means is operated in accordance with the movement of the steering member to thereby control the hydraulic pressure to the hydraulic chamber means, steering ratio setting means connected with said control rod means for determining a ratio of a steered angle of the front wheels to a steered angle of the rear wheels by changing a ratio of the movement of said steering member to a movement of said control rod means.

11. A vehicle steering system in accordance with claim 10 which includes first casing means supporting said steering rod means for slidable movements and second casing means formed as a unit with said first casing means and encompassing said steering ratio setting means.

12. A vehicle steering system in accordance with claim 11 in which said second casing means is open at a lower side and covered by oil pan means.

13. A vehicle steering system in accordance with claim 11 in which said piston means of the power assist piston-and-cylinder means is formed integral with said steering rod means, and said cylinder means of the power assist piston-and-cylinder means is formed in said second casing means.

* * * * *